US007754337B2

United States Patent
Hatta et al.

(10) Patent No.: US 7,754,337 B2
(45) Date of Patent: Jul. 13, 2010

(54) METHOD OF REFORMING INTERLAYER FILM FOR HEAT-INSULATING LAMINATED GLASS

(75) Inventors: Bungo Hatta, Koka (JP); Juichi Fukatani, Koka (JP)

(73) Assignee: Sekisui Chemical Co., Ltd., Osaka-shi (JP)

( * ) Notice: Subject to any disclaimer, the term of this patent is extended or adjusted under 35 U.S.C. 154(b) by 1004 days.

(21) Appl. No.: 10/568,349

(22) PCT Filed: Aug. 4, 2005

(86) PCT No.: PCT/JP2005/014340

§ 371 (c)(1),
(2), (4) Date: May 11, 2006

(87) PCT Pub. No.: WO2006/013944

PCT Pub. Date: Feb. 9, 2006

(65) Prior Publication Data
US 2007/0077411 A1  Apr. 5, 2007

(30) Foreign Application Priority Data
Aug. 5, 2004 (JP) ............................. 2004-229650

(51) Int. Cl.
*B32B 17/10* (2006.01)
*B32B 27/20* (2006.01)

(52) U.S. Cl. .................. 428/437; 264/480; 264/482; 264/488; 264/490; 264/494; 427/551; 427/553; 427/554; 427/558; 428/436

(58) Field of Classification Search ................ 264/480, 264/482, 488, 490, 494; 427/551, 553, 554, 427/558; 428/436, 437
See application file for complete search history.

(56) References Cited

U.S. PATENT DOCUMENTS 6,090,736 A 7/2000 Taoda et al.
7,160,624 B2 * 1/2007 Fukatani et al. ............. 428/437

FOREIGN PATENT DOCUMENTS

| EP | 1419999 A1 | 5/2004 |
|---|---|---|
| JP | 62-003050 A | 1/1987 |
| JP | 06-305785 A | 11/1994 |
| JP | 06-336525 A | 12/1994 |
| JP | 09-309798 A | 12/1997 |
| JP | 2000-016841 | 1/2000 |
| JP | 2000-154046 | 6/2000 |
| JP | 2000-264632 | 9/2000 |
| JP | 2001-240769 A | 9/2001 |
| JP | 2002-326846 | 11/2002 |
| JP | 2003-261361 A | 9/2003 |
| WO | WO-98/40324 A1 | 9/1998 |
| WO | WO 01/25162 | 4/2001 |

OTHER PUBLICATIONS

Office Action in RU 2007107950 with its English translation.
Supplementary European Search Report issued in counterpart European Application No. 05768931.7.

* cited by examiner

*Primary Examiner*—D. S Nakarani
(74) *Attorney, Agent, or Firm*—Connolly Bove Lodge & Hutz LLP

(57) ABSTRACT

A method of reforming an interlayer film for heat-insulating laminated glass by which an interlayer film for heat-insulating laminated glass capable of exhibiting an excellent optical property may be obtained even if heat-insulating fine particles covered with an inert substance are used, an interlayer film for heat-insulating laminated glass, and laminated glass is provided. The method comprises irradiating an interlayer film for heat-insulating laminated glass comprising a heat-insulating fine particle covered with an inert substance, a matrix resin, and a liquid plasticizer with a high energy ray comprising an electromagnetic wave having energy of 3.0 eV or more to improve transmittance of visible light having a wavelength of 380 to 780 nm, and also to reduce transmittance of a near-infrared radiation having a wavelength of 780 to 2100 nm.

22 Claims, No Drawings

METHOD OF REFORMING INTERLAYER FILM FOR HEAT-INSULATING LAMINATED GLASS

TECHNICAL FIELD

The present invention relates to a method of reforming an interlayer film for heat-insulating laminated glass by which an interlayer film for heat-insulating laminated glass capable of exhibiting an excellent optical property may be obtained even if heat-insulating fine particles covered with an inert substance are used, an interlayer film for heat-insulating laminated glass, and laminated glass.

BACKGROUND ART

Laminated glass has been used widely for windowpanes of vehicles such as automobile, aircrafts, and buildings since glass fragments are prevented from scattering and the laminated glass is thus safe even if it is broken by external impact. As the laminated glass, those obtained by inserting an interlayer film for laminated glass made of polyvinyl acetal resin such as polyvinyl butyral resin plasticized by a plasticizer between at least one pair of glass and uniting them are exemplified.

However, although being excellent in the safety, the laminated glass using such an interlayer film for laminated glass is inferior in heat-insulating property. Although infrared rays with a wavelength of 780 nm or more than that of visible light of light rays have energy as low as about 10% as compared with ultraviolet rays, the infrared rays have high thermal effects and once absorbed in a substance, the infrared rays are released as heat and generally called heat rays since they increase temperature. Accordingly, if it is made possible to shield infrared rays (heat rays) with high thermal effects of light beam entering through the windshield and side glass of an automobile, the heat-insulating property is heightened and the temperature increase in the inside of the automobile can be suppressed. Recently, the surface area for glass opening parts tends to increase and necessity to heighten the heat-insulating property for laminated glass and supply the heat ray-cutting function has been intensified.

To deal with the requirement, Patent Document 1 discloses an interlayer film for laminated glass obtained by dispersing heat-insulating particles such as indium tin oxide fine particles (hereinafter, referred to as ITO fine particles) and antimony-doped tin oxide fine particles having the heat-insulating property in polyvinyl acetal resin. The laminated glass using such an interlayer film for laminated glass is excellent in the heat-insulating property and electromagnetic wave permeability.

However, in the case heat-insulating fine particles such as the ITO fine particles and the antimony-doped tin oxide fine particles are used for a composite material with an organic material such as resin, the fine particles may possibly deteriorate an organic material such as a matrix resin owing to the photocatalytic activity, thermal activity, surface acid activity, and surface base activity of the fine particles. Further, because of the activity of the fine particle surface, deterioration of an organic material such as a matrix resin is promoted under irradiation of high energy rays such as super UV light and super Xe light to result in a problem of deterioration of visible light transmittance. That is, with respect to the interlayer film for heat-insulating laminated glass comprising heat-insulating fine particles covered with an inert substance, a matrix resin, and a liquid plasticizer, there occurs a problem that the weather resistance duration and decrease of the visible light transmittance have a proportional relation in a weather resistance test by heat, light and the like and as compared with those using an interlayer film comprising no ITO fine particles and antimony-doped tin oxide fine particles, and visible light transmittance is considerably decreased and a yellow index value, which is an indicator of yellowness, and the b* value in CIE1976 L*a*b* display system are significantly increased.

To solve the problem, Patent Document 2 discloses technique of suppressing the photocatalytic activity of metal oxide fine particles by coating the surface of the metal oxide fine particles having a photocatalytic property with a thin layer of polysiloxane.

However, with respect to the interlayer film using such heat-insulating fine particles covered with an inter substance, although the deterioration of resin in the weather resistance test and deterioration of the optical quality can be suppressed, there occurs a new problem that the visible light transmittance of the laminated glass is decreased and the haze value increases as compared with those in the case of using heat-insulating fine particles not subjected to the surface treatment.

Patent Document 1: WO 01/25162
Patent Document 2: Japanese Kokai Publication 2000-264632

DISCLOSURE OF THE INVENTION

Problems which the Invention is to Solve

It is an object of the present invention to provide a method of reforming an interlayer film for heat-insulating laminated glass by which an interlayer film for heat-insulating laminated glass capable of exhibiting an excellent optical property may be obtained even if heat-insulating fine particles covered with an inert substance are used, an interlayer film for heat-insulating laminated glass, and laminated glass.

Means for Solving the Object

The present invention provides a method of reforming an interlayer film for heat-insulating laminated glass, wherein a high energy ray is irradiated to an interlayer film for heat-insulating laminated glass comprising a heat-insulating fine particle covered with an inert substance, a matrix resin, and a liquid plasticizer, to improve transmittance of visible light having a wavelength of 380 to 780 nm, and also to reduce transmittance of a near-infrared radiation having a wavelength of 780 to 2100 nm.

Hereinafter, the present invention will be described more in detail.

The present inventors have made investigations and consequently have found that it is possible to improve the transmittance of visible light and also to reduce the transmittance of near-infrared radiation by irradiating a high energy ray even if an interlayer film for heat-insulating laminated glass using heat-insulating fine particles covered with an inert substance is used, and thus, the present invention is accomplished.

Consequently, an interlayer film for laminated glass having high transparency to visible light and excellent heat-insulating property without yellowing following the deterioration of the interlayer film resin can be obtained.

The high energy ray in the present invention means an electromagnetic wave having energy of 3.0 eV or more. The high energy ray is not particularly limited and preferable examples are a super UV light (manufactured by Iwasaki Electric Co., Ltd.), a UV ray, a visible light, a super Xe light (manufactured by Iwasaki Electric Co., Ltd.), a Xe light, a laser beam, an electron beam, a microwave, and the like. These high energy rays may be used alone or two or more of them may be used in combination. Particularly, in the case the high energy ray comprises light having a wavelength of 300 to 450 nm, the effect to improve the transmittance of visible light and to reduce the transmittance of an infrared radiation becomes significant and therefore it is preferable.

A method for irradiating a high energy ray may be carried out by irradiating in the interlayer film state or irradiating in the laminated glass state, however it is preferable to irradiate the high energy ray in the laminated glass state in order to prevent thermal deformation of the interlayer film resin by high energy ray irradiation. In this connection, foams may be formed due to the influence of water, and therefore, in the case the high energy ray is irradiated in high humidity, it is preferable to carry out the operation in dry atmosphere. Additionally, a high energy ray may be irradiated directly to heat-insulating fine particles covered with an inert substance to obtain reformed heat-insulating fine particles.

In the case the high energy ray is irradiated in the interlayer film state, in order to prevent the deterioration and the change of state of the resin by humidity and heat, the interlayer film is prevented from contact with water by pressure bonding, for example, a polyethylene terephthalate film and to prevent thermal deformation, irradiation is carried out for a long duration with low intensity but not for a short time with high intensity and thus irradiation should be carried out very carefully.

In the case the high energy ray is irradiated in the laminated glass state, transmission of the high energy ray is sometimes inhibited and energy may not be supplied sufficiently to the heat-insulating fine particles in the case of using shade glass or green glass, so that those so thin as to prevent entire absorption of the high energy ray, maintaining impact strength, should be employed or laminated glass may be produced after irradiation of a high energy ray in the interlayer film state.

Although depending on the intensity of a light source, the irradiation duration of the high energy ray is required to be at least 50 hours. However, in the case of excess irradiation energy of the high energy ray, it leads to deterioration of resins and organic type additives and causes to reduce the transmittance of visible light and therefore the duration is required to be the minimum of the necessity.

It is preferable that the high energy ray is irradiated so that a yellow index value change ($\Delta YI$) of an interlayer film for heat-insulating laminated glass is in the range of 0% or less, and a b* value change ($\Delta b^*$) in CIE1976 L*a*b* display system is in the range of 0% or less. That is, it is required to prevent deterioration of transparency of the laminated glass due to excess high energy ray irradiation.

The yellow index value (YI) and the b* value in the CIE1976 L*a*b* display system can be calculated from the measurement data in the measurement of visible light transmittance. The yellow index value change ($\Delta YI$) and the b* value change ($\Delta b^*$) are values calculated by subtracting the values before high energy ray irradiation from the values after high energy ray irradiation, respectively, represented by the following formulas (1) and (2).

$\Delta YI = YI$ (after irradiation of high energy ray) $-YI$ (before irradiation of high energy ray) \hfill (1)

$\Delta b^* = b^*$ (after irradiation of high energy ray) $-b^*$ (before irradiation of high energy ray) \hfill (2)

Examples of a light source for irradiating a high energy ray may be a high pressure mercury lamp type ultraviolet light, an ultrahigh pressure mercury lamp type ultraviolet light, a metal halide type ultraviolet light, a xenon arc lamp, a sunshine carbon arc light source, a high power type fluorescent light, and the like. Also, it is possible to use solar radiation, however it takes a rather long time to exhibit sufficient effect and therefore, it is not practical.

The interlayer film for heat-insulating laminated glass to be an object of the reforming method of the present invention comprises heat-insulating fine particles, a matrix resin, and a liquid plasticizer.

The heat-insulating fine particles are not particularly limited and examples are indium tin oxide (ITO) fine particles, antimony-doped tin oxide (ATO) fine particles, aluminum-doped zinc oxide fine particles, indium-doped zinc oxide fine particles, gallium-doped zinc oxide fine particles, lanthanum hexaboride fine particles, cerium hexaboride fine particles, and the like. These heat-insulating fine particles may be used alone and two or more of them may be used in combination.

The surfaces of heat-insulating fine particles are covered with an inert substance. The inert substance is not particularly limited, however, for example, insulating metal oxides having a wide band gap of 5.0 eV or more may be used preferably. Insulating metal oxide having a wide band gap of 7.0 eV or more may be used more preferably. Examples of such insulating metal oxides are silicon oxide, aluminum oxide, zirconium oxide, calcium oxide and the like.

As the inert substance, ammonium phosphates such as ammonium phosphomolybdate (hydrated), ammonium phosphovanadate (hydrated), ammonium phosphotungstate (hydrated), and ammonium phosphate (hydrated) are preferably used.

As the inert substance, phosphates such as a hydroxyl apatite, a carbonate apatite, a fluoride apatite, a tricalcium phosphate and an octacalcium phosphate are also preferably used.

As the inert substance, coupling agents such as an organosilane compound, an organotitanium compound, an organoaluminum compound, an organozirconium-aluminum compound are also preferably used.

As the inert substance, a compound having an alcoholic hydroxyl group, a compound having a phenolic hydroxyl group, which may be reacted with the particle surface, a compound having an isocyanate group, a carbon tetrachloride, a quaternary-ammonium-salt compound, a $Mo(\eta^3—C_3H_5)_4$ complex, a $Cr(\eta^3—C_3H_5)_3$ complex, a $Co_2(CO)_8$ cluster, a $Ru_3(CO)_{12}$ cluster, and the like are also preferably used.

Further, the surfaces of the heat-insulating fine particles may be made inert by covering with an amorphous state metal oxide such as an amorphous ITO, an amorphous antimony-doped tin oxide, an amorphous indium oxide, an amorphous tin oxide, an amorphous antimony oxide, an amorphous silicon oxide, an amorphous aluminum oxide, an amorphous zirconium oxide, an amorphous calcium oxide, an amorphous titanium oxide, an amorphous zinc oxide, and an amorphous cerium oxide.

The state of the covering with the inert substance may be sufficient if the active surfaces of the heat-insulating fine particles are protected and deterioration of the interlayer film resin is protected and the surfaces may completely be covered or may be covered in stripes while some parts may be uncovered. Also, the inert substance may be adsorbed, supported, or deposited on the surfaces of the heat-insulating fine particles. Alternatively, the inert substance may be dissolved to form a solid solution or be doped in the surfaces of the heat-insulating fine particles.

To heighten the dispersibility of the heat-insulating fine particles in a resin or a plasticizer, the surfaces of the heat-insulating fine particles may be treated with a hydrophobic agent or a dispersant. The hydrophobic agent or the dispersant are not particularly limited and examples are coupling agents such as an organosilane compound, an organotitanium compound, an organoaluminum compound, an organozirconium-aluminum compound, and an organochromium compound; a compound having an alcoholic hydroxyl group and/or a phenolic hydroxyl group reactive with the particle surfaces; a compound having an isocyanate group; a carbon tetrachloride; a quaternary ammonium compound; a $Mo(\eta^3$—$C_3H_5)_4$ complex; a $Cr(\eta^3$—$C_3H_5)_3$ complex; a $Co_2(CO)_8$ cluster; a $Ru_3(CO)_{12}$ cluster, and the like.

The hydrophobic agent is not particularly limited and an organosilane compound having a hydrolyzable silyl group is preferable since agglomeration of fine particles is hardly caused at the time of surface treatment of the heat-insulating fine particles and therefore, the haze increase of the solution can be suppressed and also since the compound gives excellent dispersion stability in the case of long time storage and scarcely affect optical properties.

The organosilane compound having a hydrolyzable silyl group has a molecular skeleton comprising 1 to 3 hydrolyzable functional groups bonded to silicon atom. One kind of the organosilane compounds may be used alone or a plurality of kinds may be used in combination. The molecular skeleton comprising 1 to 3 hydrolyzable functional groups bonded to silicon atom may include the case that a plurality of hydrolyzable groups are bonded through a single silane compound and also the case that at least one hydrolyzable group is bonded to respective silicon atoms if two or more silicon atoms exist in one molecule.

The hydrolyzable silyl groups are functional groups wherein bonding of the hydrolysable group with the silicon atom can be disconnected by hydrolysis reaction. The hydrolyzable groups are not particularly limited and conventionally known functional groups may be used and examples are an alkoxy group, an oxime group, an alkenyloxy group, an acetoxy group; and halogen group such as chlorine and bromine. The all hydrolyzable groups may be the same kind one or different kind ones from one another.

The alkoxy group is not particularly limited and examples may include a methoxy group, an ethoxy group, a propyloxy group, an isopropyloxy group, a butoxy group, a tert-butoxy group, a phenoxy group, a benzyloxy group, and the like. The same alkoxy group may be used or different alkoxy groups may be used in combination in the case of a dialkoxysilyl group or a trialkoxysilyl group. Further, different kinds of functional groups may be used in combination and a plurality of kinds of different organosilane compounds may be used in combination.

Examples of the organosilane compound having a hydrolyzable silyl group may include dimethoxydimethylsilane, cyclohexyldimethoxymethylsilane, diethoxydimethylsilane, dimethoxymethyloctylsilane, diethoxymethylvinylsilane, chloromethyl(diisopropoxy)methylsilane, dimethoxymethylphenylsilane, diethoxydiphenylsilane, methyltrimethoxysilane, trimethoxypropylsilane, isobutyltrimethoxysilane, octyltrimethoxysilane, octadecyltrimethoxysilane, methyltriethoxysilane, ethyltriethoxysilane, isobutyltriethoxysilane, octyltriethoxysilane, vinyltrimethoxysilane, vinyltriethoxysilane, allyltriethoxysilane, (3-chloropropyl)trimethoxysilane, chloromethyltriethoxysilane, tris(2-methoxyethoxy)vinylsilane, 3-glycidoxypropyltrimethoxysilane, diethoxy(3-glycidoxypropyl)methylsilane, trimethoxy[2-(7-oxabicyclo[4.1.0]-hepto-3-yl)ethyl]silane, chlorotrimethoxysilane, chlorotriethoxysilane, chlorotris(1,3-dimethylbutoxy)-silane, dichlorodiethoxysilane, 3-(triethoxysilyl)-propionitrile, 4-(triethoxysilyl)-butyronitrile, 3-(triethoxysilyl)-propyl isocyanate, 3-(triethoxysilyl)-propyl thioisocyanate, phenyltrimethoxysilane, phenyltriethoxysilane, 1,3,5,7-tetraethoxy-1,3,5,7,-tetramethylcyclotetrasiloxane, 1,3,5,7-tetramethyl-1,3,5,7,-tetrapropoxycyclotetrasiloxane, 1,3,5,7-tetraisopropoxy-1,3,5,7,-tetramethylcyclotetrasiloxane, 1,3,5,7-tetrabutoxy -1,3,5,7,-tetramethylcyclotetrasiloxane, 1,3,5,7,9-pentaethoxy-1,3,5,7,9-pentamethylcyclopentasiloxane, octamethylcyclotetrasiloxane, decamethylcyclopentasiloxane, dodecamethylcyclohexasiloxane, hexaphenylcyclotrisiloxane, octaphenylcyclotetrasiloxane, 1,3,5,7-tetramethylcyclotetrasiloxane, 1,3,5,7-tetramethyl-1,3,5,7,-tetraphenylcyclotetrasiloxane, 1,1,3,3,5,5-hexamethylcyclosilazane, 1,1,3,3,5,5,7,7-octamethylcyclotetrasilazane, 1,7-diacetoxyoctamethyltetrasiloxane, 1,7-dichlorooctamethyltetrasiloxane, 1,1,3,3,5,5-hexamethyl -1,5-dichlorotrisiloxane, 1,3-dichlorotetraisopropyldisiloxane, 1,3-diethoxytetramethyldisiloxane, 1,3-dimethoxytetramethyldisiloxane, 1,1,3,3,-tetramethyl-1,3-dichlorodisiloxane, 1,2-bis(methyldichlorosilyl)ethane, diacetoxydiphenylsilane, methyltris(ethylmethylketoxime)silane, methyltris(N,N-diethylaminoxy)silane, bis(ethylmethylketoxime)methylisopropoxysilane, bis(ethylmethylketoxime)ethoxymethylsilane, 2-(3,4-epoxycyclohexylethyl)trimethylsilane, tris(1-methylvinyloxy)vinylsilane, methyltriisopropenoxysilane, ethyltriacetoxysialne, methyltriacetoxysilane, diacetoxydimethylsilane, triacetoxyvinylsilane, tetraacetoxysilane, diacetoxymethylphenylsilane, dimethoxyethylmethylketoximemethylsilane, and the like.

As the organosilane compound having a hydrolyzable silyl group, a compound having aromatic rings such as a phenyl group and a styryl group having particularly high affinity with a plasticizer in the molecule is preferable. A plurality of aromatic functional groups may be comprised in one molecule, however a sufficient effect can be obtained if one group is comprised. Further, the aromatic ring may be bonded to any portion in hydrophobic sites, however in the case an alkyl chain or a polyoxoalkylene chain exists between a silicon atom and the aromatic ring, particularly good dispersibility can be obtained. It is supposedly attributed to the high affinity of the aromatic ring with the plasticizer and additionally prevention of agglomeration of the heat-insulating fine particles by the steric hindrance effect of the alkyl chain or polyoxyalkylene chain. Since excellent dispersibility can be obtained owing to affinity stabilization of the aromatic ring of the organosilane compound and the unsaturated bond of the plasticizer, it is more preferable to use triethylene glycol-diethyl butyrate, triethylene glycol-di-ethyl hexanoate, and triethylene glycol-di-butyl sebacate as the plasticizer. Further, phenyltrimethoxysilane, phenyltriethoxysilane, diphenyldiethoxysilane, diphenyldiethoxysilane, phenethyltrimethoxysilane, 3-(p-methoxyphenyl)propylmethyldichlorosilane, 3-(p-methoxyphenyl)propyltrichlorosialne, phenethyltrichlorosilane, 3-phenoxypropyltrichlorosilane, p-tolyltrimethoxysilane and the like, which do not have an active functional group other than a hydrolyzable silyl group reacting with surfaces of heat-insulating fine particles are preferable particularly for the interlayer film to be used for a long duration for vehicles and the like in terms of stability of the product property and safety, as compared with orgnosilane compounds having high reactivity such as acrylsilane, aminosilane, epoxysilane, vinylsilane, mercaptosilane, and isocyanate silane. The hydrolyzable organosilyl compound is generally used as an hydrophobic agent for surfaces of inorganic fine particles, and as compared with other kinds of hydrolyzable organosilane compounds, combinations of the aromatic ring-comprising organosilane compounds with triethylene glycol-di-ethyl butyrate, triethylene glycol-di-ethyl hexanoate, and triethylene glycol-di-butyl sebacate give considerably high dispersibility and long term stability relevant to the optical property. Further, since the aromatic rings do not cause chemical reaction with ambient components such as air and humidity, safety is guaranteed in the production line and no influences on the final products are caused.

An organotitanate compound may be used as other hydrophobic agents. The organotitanate compound is not particularly limited and examples are isopropyltriisostearoyl titanate, isopropyl-tri-n-dodecylbenzenesulfonyl titanate, isopropyl-tris(dioctylpyrophosphate) titanate, tetraisopropylbis(dioctylphosphite) titanate, tetraoctylbis(ditridecylphosphite) titanate, tetra(2,2-diallyloxymethyl-l-butyl)bis (ditridecyl)phosphite titanate, bis(dioctylpyrophosphate) oxyacetate titanate, bis(dioctylpyrophosphate)ethylene titanate, bis(dioctylpyrophosphate)ethylene titanate, isopropyltrioctanoyl titanate, isopropyldimethacryloisostearoyl titanate, isopropylisostearoyldiacryl titanate, isopropyltri(dioctylphosphate) titanate, isopropyltricumylphenyl titanate, isopropyltri(N-aminoethyl-aminomethyl) titanate, and the like. Particularly, in consideration of the affinity with the plasticizer of -the interlayer film, isopropyltri-n-dodecylbenzenesulfonyl titanate having an aromatic ring in the structure is excellent in the dispersibility.

As a method for surface treatment for the heat-insulating fine particles with the hydrophobic agent, a method of replacing a hydroxy group existing in the surface of the heat-insulating fine particle with an alcoholic hydroxyl group and a phenolic hydroxyl group is exemplified. A compound having an alcoholic hydroxyl group and a phenolic hydroxyl group is not particularly limited and examples may include methyl alcohol, ethyl alcohol, n-propyl alcohol, n-butyl alcohol, n-pentyl alcohol, n-hexyl alcohol, n-heptyl alcohol, n-octyl alcohol, n-decyl alcohol, n-dodecyl alcohol, n-tetradecyl alcohol, n-hexadecyl alcohol, n-octadecyl alcohol, isopropyl alcohol, isobutyl alcohol, sec-butyl alcohol, tert-butyl alcohol, isopentyl alcohol, (−)-2-methyl-1-butanol, tert-pentyl alcohol, cyclopentanol, cyclohexanol, allyl alcohol, crotyl alcohol, methylvinyl carbinol, benzyl alcohol, α-phenylethyl alcohol, β-phenyl alcohol, diphenylcarbinol, triphenylcarbinol, cinnamyl alcohol, ethylene glycol, propylene glycol, 1,3-propanediol, glycerin, pentaerythritol, catechol, aminophenol, methylphenol, p-ethylphenol, p-octylphenol, o-methoxyphenol, o-ethoxyphenol, p-dodecylphenol, 2,4,6-tris(dimethylaminomethyl)phenol, 2,3,4-trihydroxybenzophenone, α-naphthol, β-naphthol, p-nitrophenol, o-nitrophenol, nonylphenol, hydroquinone, m-hydroxybenzaldehyde, p-hydroxybenzaldehyde, methyl p-oxybenzoate, β-oxynaphthoic acid, salicylic acid, 1,4-dihydroxynaphthalene, o-phenylphenol, m-phenylphenol, p-phenylphenol, phenol, 4-phenoxyphenol, 4-t-butylcatechol, 2-tert-butylhydroquinone, p-t-butylphenol, protocatechuic acid, heptylparabene, 2-methyl-6-t-butylphenol, resorcin, and the like. They may be used alone or a plurality of them may be used in combination. Further, polyalcohol having two or more alcohol type hydroxyl groups in one molecule or polyols may be used. In consideration of the affinity with the plasticizer of the interlayer film, compounds having an aromatic ring in the structure are excellent in the dispersibility.

The method of surface treatment of the heat-insulating fine particles using the hydrophobic agent and dispersant is not particularly limited and a conventionally known method can be used and dry methods such as a fluidized bed method and a spray method; wet methods using water, organic solvents, and the like; an integral blend method of directly adding a reactive surface treatment agent to an organic solvent; an autoclave method; treatment using supercritical fluid; a refluxing method, and the like may be used.

If the hydrophobic agent and dispersant can be used preferably since dispersibility in the resin and the plasticizer is improved in the case the inert substance is an aromatic compound.

There is description of same kinds of compounds as examples of the insert substance as those of the hydrophobic agent or the dispersant, it shows the case the inert substance has an effect to provide hydrophobicity and dispersibility.

To improve the transparency to the visible light, the preferable thickness of the inert substance is 1 to 10 nm and more preferably 1 to 5 nm. The refractive index of the inert substance is preferable to be lower than that of the heat-insulating fine particles and higher than the matrix resin and liquid plasticizer.

The heat-insulating fine particles may exist in form of primary particles or be partially agglomerated in the interlayer film for heat-insulating laminated glass. In the state that the surfaces are protected with the inert substance, the preferable lower limit of an average primary particle diameter of the heat-insulating fine particles is 5 nm and the preferable upper limit of that is 30 nm, and in the state that the surfaces are protected with the inert substance, the agglomerates are preferable to have the average particle diameter within a range of 10 to 100 nm. In the case the average particle diameter is lower than these ranges, the particles further agglomerate and therefore the haze value may deteriorate, and in the case the average particle diameter is higher than these ranges, the effect to improve the visible light transmittance by irradiation of high energy ray and reduction of the infrared radiation transmittance, which is the effect of the present invention, may not obtained sufficiently.

The preferable lower limit of the content of the heat-insulating fine particles in the interlayer film for heat-insulating laminated glass is 0.1 parts by weight, and the preferable upper limit of that is 3.0 parts by weight to 100 parts by weight of a polyvinyl acetal resin. If it is less than 0.1 parts by weight, the infrared ray-cutting effect may not be obtained. If it is more than 3.0 parts by weight, the energy of the high energy ray may possibly not supplied evenly to the entire heat-insulating fine particles in the interlayer film to result in deterioration of the effect and reduction of visible light transmittance.

The matrix resin is not particularly limited, however, for example, polyvinyl acetal resin is preferable. Above all, polyvinyl butyral is particularly preferable.

In consideration of the needed physical property, a plurality of polyvinyl acetal resins may be used in combination. Further, vinyl acetal copolymer resin obtained by reaction of a plurality of kinds of aldehydes at the time of acetalization may be used. The preferable lower limit of the acetalization degree of the polyvinyl acetal resin is 40% and the preferable upper limit of that is 85% and the more preferable lower limit of that is 60% and the more preferable upper limit of that is 75%.

The polyvinyl acetal resin can be produced by acetalization of polyvinyl alcohol with an aldehyde.

The polyvinyl alcohol to be a raw material is generally obtained by saponification of polyvinyl acetate and polyvinyl alcohol with a saponification degree of 80 to 99.8 mol % is generally used.

The preferable lower limit of polymerization degree of the polyvinyl alcohol is 200 and the preferable upper limit of that is 3000. If it is less than 200, the penetration resistance of the laminated glass to be obtained may be decreased and if it is more than 3000, the formability of the resin film is deteriorated and the rigidity of the resin film may become so high as to worsen the processibility. The lower limit is more preferably 500 and the upper limit is more preferably 2000.

The aldehyde is not particularly limited and in general, aldehydes having 1 to 10 carbon atoms such as n-butylaldehyde, isobutylaldehyde, n-valeraldehyde, 2-ethylbutylaldehyde, n-hexylaldehyde, n-octylaldehyde, n-nonylaldehyde, n-decylaldehyde, formaldehyde, acetaldehyde, benzaldehyde, and the like are used. Particularly, n-butylaldehyde, n-hexylaldehyde, and n-valeraldehyde are preferable and butylaldehyde having 4 carbon atoms is more preferable.

The liquid plasticizer is not particularly limited and examples are organic type plasticizers such as monobasic organic acid esters and polybasic organic acid esters and phosphoric acid type plasticizers such as organic phosphoric acid type and organic phosphorous acid type.

Examples of the monobasic organic acid ester type plasticizers are glycol type esters obtained by reaction of glycols such as triethylene glycol, tetraethylene glycol, and tripropylene glycol and monobasic organic acids such as butyric acid, isobutyric acid, caproic acid, 2-ethylbutyric acid, heptylic acid, n-octylic acid, 2-ethylhexylic acid, pelargonic acid (n-nonyl acid), and decylic acid. Particularly, triethylene glycols such as triethylene glycol-dicaproic acid ester, triethylene glycol-di-2-ethylbutyric acid ester, triethylene glycol-di-n-octylic acid ester, and triethylene glycol-di-2-ethylhexylic acid ester are preferable.

Examples of the polybasic organic acid ester type plasticizers are esters of polybasic organic acids such as adipic acid, sebacic acid, and azelaic acid and straight or branched alcohols having 4 to 8 carbons. Particularly, dibutyl sebacate, dioctyl azelate, dibutylcarbitol adipate are preferable. Examples of the organic phosphoric acid type plasticizers are tributoxyethyl phosphate, isodecylphenyl phosphate, and tri-isopropyl phosphate.

The preferable lower limit of the content of the liquid plasticizer in the interlayer film for heat-insulating laminated glass is 20 parts by weight and the preferable upper limit of that is 100 parts by weight to 100 parts by weight of a thermoplastic resin. If it is less than 20 parts by weight, the penetration resistance may possibly be decreased and if it is more than 100 parts by weight, the plasticizer bleeds out to possibly deteriorate the transparency and adhesive strength and make the optical strain of the laminated glass to be obtained significant. The more preferable lower limit is 30 parts by weight and the more preferable upper limit is 60 parts by weight.

The interlayer film for heat-insulating laminated glass is preferable to contain an adhesive strength adjuster.

The adhesive strength adjuster is not particularly limited and alkali metal salts and/or alkaline earth metal salts are preferable to be used. Examples of the alkali metal salts and/or alkaline earth metal salts are not particularly limited and salts of potassium, sodium, and magnesium can be exemplified. Acids for forming the salts are not particularly limited and examples are carboxylic organic acids such as octylic acid, hexylic acid, butyric acid, acetic acid, and formic acid and inorganic acids such as hydrochloric acid and nitric acid.

Among the alkali metal salts and/or alkaline earth metal salts, alkali metal salts and alkaline earth metal salts of organic acids having 2 to 16 carbon atoms are preferable and magnesium salts of carboxylic acids having 2 to 16 carbon atoms and potassium salts of carboxylic acids having 2 to 16 carbon atoms are more preferable.

The magnesium salts or potassium salts of carboxylic acids having 2 to 16 carbon atoms are not particularly limited and, for example, magnesium acetate, potassium acetate, magnesium propionate, potassium propionate, magnesium 2-ethylbutanate, potassium 2-ethylbutanate, magnesium 2-ethylhexanate, and potassium 2-ethylhexanate are used preferably. They may be used alone and two or more of them may be used in combination.

The content of the alkali metal salts and/or alkaline earth metal salts in the interlayer film for heat-insulating laminated glass is not particularly limited and the preferable lower limit is 0.001 parts by weight and the preferable upper limit is 1.0 part by weight to 100 parts by weight of the polyvinyl acetal resin. If it is less than 0.001 parts by weight, the adhesive strength tends to be decreased in the peripheral part of the interlayer film for heat-insulating laminated glass in highly humid atmosphere and if it is more than 1.0 part by weight, the adhesive strength is so decreased and also the transparency of the interlayer film for heat-insulating laminated glass may be lost. The more preferable lower limit is 0.01 parts by weight and the more preferable upper limit is 0.2 parts by weight.

Preferably, the interlayer film for heat-insulating laminated glass further comprises an ultraviolet ray absorbent.

As the ultraviolet ray absorbent are preferably malonic acid ester type ultraviolet ray absorbents such as propanedioic acid ester with [(4-methoxyphenyl)-methylene]-dimethyl ester (Hostavin PR-25, manufactured by Clariant) and/or oxalic acid anilide type ultraviolet ray adsorbents such as 2-ethyl-2'-ethoxy oxalanilide (Sanduvor-VSU, manufactured by Clariant).

Besides, conventionally known benzotriazole type, benzophenone type, triazine type, and benzoate type ultraviolet ray absorbents may be used in combination as the ultraviolet ray absorbent.

Examples of the benzotriazole type ultraviolet ray absorbents may be hindered amine type ones such as 2-(2'-hydroxy-5'-methylphenyl)benzotriazole (Tinuvin P, manufactured by Ciba-Geigy Corp.), 2-(2'-hydroxy-3',5'-di-t-butylphenyl)benzotriazole (Tinuvin 320, manufactured by Ciba-Geigy Corp.), 2-(2'-hydroxy-3'-t-butyl-5'-methylphenyl)-5-chlorobenzotriazole (Tinuvin 326, manufactured by Ciba-Geigy Corp.), 2-(2'-hydroxy-3',5'-di-amylphenyl)benzotriazole (Tinuvin 328, manufactured by Ciba-Geigy Corp.), and LA-57 (manufactured by Adeka Argus Chemical Co., Ltd.).

Examples of the benzophenone type ultraviolet ray absorbents may be octabenzone (Chimassorb 81, manufactured by Ciba-Geigy Corp.).

Examples of the triazine type ultraviolet ray absorbents may be 2-(4,6-diphenyl-1,3,5-triazin-2-yl)-5-(hexyl)oxyphenol (Tinuvin 1577FF, manufactured by Ciba-Geigy Corp.).

Examples of the benzoate type ultraviolet ray absorbents may be 2,4-di-t-butylphenyl-3,5-di-t-butyl-4-hdyroxybenzoate (Tinuvin 120, manufactured by Ciba-Geigy Corp.).

The content of the ultraviolet ray absorbents in the interlayer film for heat-insulating laminated glass is not particularly limited and the preferable lower limit is 0.01 parts by weight and the preferable upper limit is 5.0 parts by weight to 100 parts by weight of the polyvinyl acetal resin. If it is less than 0.01 parts, the ultraviolet ray absorption effect is scarcely obtained and if it is more than 5.0 parts by weight, the weather resistance of the resin may possibly be deteriorated. The more preferable lower limit is 0.05 parts by weight and the more preferable upper limit is 1.0 part by weight.

To suppress the color alteration of the resin by high energy ray irradiation, a color tone adjuster such as a blue ink agent may be added.

The interlayer film for heat-insulating laminated glass may further comprise, based on the necessity, other additives such as an antioxidant, a photo-stabilizer, modified silicone oil as an adhesive strength adjuster, a flame retardant, an antistatic agent, an adhesive strength adjuster, a moisture-resistant agent, a heat ray reflecting agent, and a heat ray absorbent.

The antioxidant is not particularly limited and examples are, as phenolic type ones, 2,6-di-tert-butyl-p-cresol (BHT) (trade name: Sumilizer BHT, manufactured by Sumitomo Chemical Co., Ltd.), tetrakis-[methylene-3-(3',5'-di-t-butyl-4'-hydroxyphneyl)propionate]methane (trade name: Irganox 1010, manufactured by Ciba-Geigy), and the like.

As a hindered amine type one, the stabilizer is Adeka Stab LA-57 (trade name, manufactured by Asahi Denka Kogyo K.K.).

The modified silicone oil is not particularly limited and examples may include epoxy-modified silicone oil, ether-modified silicone oil, ester-modified silicone oil, amine-modified silicone oil, and carboxyl-modified silicone oil disclosed in Japanese Kokoku Publication Sho-55-29950. These modified silicone oils are generally liquids obtained by reaction of polysiloxanes with compounds to be modified.

The modified silicone oils may be used alone or two or more kinds of them may be used in combination.

The preferable lower limit of the molecular weight of the modified silicone oils is 800 and preferable upper limit of that is 5000. If it is less than 800, the localization in the surface may possibly be decreased and if it is more than 5000, the compatibility with the resin may be deteriorated and the modified silicone oils bleed out to the surface of the interlayer film for heat-insulating laminated glass to be obtained to possibly lower the adhesive strength to glass. The more preferable lower limit is 1500 and the more preferable upper limit is 4000.

The preferable lower limit of the content of the modified silicone oils in the interlayer film for heat-insulating laminated glass is 0.01 parts by weight and the preferable upper limit of that is 0.2 parts by weight to 100 parts by weight of the polyvinyl acetal resin. If it is less than 0.01 parts by weight, the effect to prevent whitening by moisture absorption may possibly become insufficient and if it is more than 0.2 parts by weight, the compatibility with the resin may be deteriorated and the modified silicone oils bleed out to the surface of the interlayer film for heat-insulating laminated glass to be obtained to possibly lower the adhesive strength to glass. The more preferable lower limit is 0.03 parts by weight and the more preferable upper limit is 0.1 parts by weight.

However, if these adhesives to be used in the present invention have a property of partially or entirely absorbing the high energy ray, they possibly hinder the effect of the present invention, and therefore, their addition should be suppressed to the minimum.

The film thickness of the interlayer film for heat-insulating laminated glass is not particularly limited and in consideration of the minimum penetration resistance required for the laminated glass to have, it is practically preferable to be 0.1 to 1.0 mm. It is more preferably 0.3 to 0.8 mm. If it is thicker than that range, the energy dose to the heat-insulating fine particles by the high energy ray irradiation is so lowered that the effect of the present invention may not be obtained. Further, to improve the penetration resistance, another interlayer film may be laminated on the interlayer film of the present invention based on the necessity, and in this case also, the thickness and the like should be proper not to prevent the energy of the high energy ray to the heat-insulating fine particles.

The interlayer film for heat-insulating laminated glass is preferable to have a specific dielectric constant of 4.2 or less and/or a dielectric loss tangent tan$\delta$ of 0.08 or less at 10 MHz, a specific dielectric constant of 3.8 or less and/or a dielectric loss tangent tan$\delta$ of 0.08 or less at 100 MHz, and a specific dielectric constant of 3.3 or less and/or a dielectric loss tangent tan$\delta$ of 0.08 or less at 1 GHz. Accordingly, the electromagnetic wave absorption property becomes excellent.

According to the method for reforming the interlayer film for heat-insulating laminated glass of the present invention, even in the case of using heat-insulating fine particles covered with an inert substance, an interlayer film for heat-insulating laminated glass exhibiting an excellent optical property can be obtained by high energy ray irradiation.

The interlayer film for heat-insulating laminated glass (hereinafter, referred to as a reformed interlayer film in some cases) to be obtained by the method for reforming an interlayer film for heat-insulating laminated glass also constitutes the present invention.

The reformed interlayer film has, as indexes of the transparency, visible light transmittance of 70% or more, visible light transmittance alteration $\Delta$Tv of 1.0% or more, solar radiation transmittance ratio to the visible light transmittance in a wavelength range of 300 to 2100 nm of 85% or less, and haze value of 1.0% or less.

The visible light transmittance means transmittance of light with wavelength in a range of 380 to 780 nm and is transmittance of light with wavelength in a range of 380 to 780 nm measured according to JIS Z 8722 (2000), "Methods of colour measurement—Reflecting and transmitting objects" and JIS R 3106 (1998), "Testing method on transmittance, reflectance and emittance of flat glasses and evaluation of solar heat gain coefficient". The visible light transmittance alteration is a value calculated by subtracting the visible light transmittance before the high energy ray irradiation from the visible light transmittance after the high energy ray irradiation represented by the following formula (3).

Visible light transmittance alteration ($\Delta$Tv)=Tv (visible light transmittance after irradiation of high energy ray)–Tv (visible light transmittance before irradiation of high energy ray) (3)

The reformed interlayer film has the ratio Ta of transmittance integrated value of 15.0% or more in the wavelength range of 1200 to 1400 nm, and/or the ratio Tb of transmittance integrated value of 10.0% or less in the wavelength range of 1400 to 1600 nm, and/or the ratio Tc of transmittance integrated value of 3.0% or less in the wavelength range of 1600 to 1800 nm, and/or the ratio Td of transmittance integrated value of 2.0% or less in the wavelength range of 1800 to 2000 nm, and/or the ratio Te of transmittance integrated value of 2.0% or less in the wavelength range of 2000 to 2400 nm in the solar radiation transmittance integrated value T in a wavelength range of 300 to 2500 nm.

Accordingly, high transparency can be obtained in the visible light region and absorption of the infrared rays which cause thermal effects, particularly rays in a wavelength excellent in the absorbability in the skin, can be suppressed if the transmittance integrated value is within the range and therefore skin temperature increase can be suppressed.

The heat-insulating property of the reformed interlayer film is evaluated on the basis of the infrared ray transmittance Tir in a wavelength range of 780 to 2100 nm standardized and calculated using weight coefficient described in JIS Z 8722 and JIS R 3106. Further, the infrared ray transmittance is a value calculated by subtracting the infrared ray transmittance before irradiation of the high energy ray from the infrared ray transmittance after irradiation of the high energy ray represented by the following formula (4):

Infrared ray transmittance alteration ($\Delta$Tir)=Tir (infrared ray transmittance after irradiation of high energy ray)–Tir (infrared ray transmittance before irradiation of high energy ray)  (4).

Reformed heat-insulating fine particles obtained by irradiating high energy ray comprising an electromagnetic wave having energy of 3.0 eV or more to the heat-insulating fine particles covered with an inert substance also constitute the present invention.

Laminated glass obtained by using the reformed interlayer film also constitutes the present invention.

The glass to be used for the laminated glass is not particularly limited and commonly used transparent plate glass can be used and examples may include organic glass such as float plate glass, polished plate glass, die plate glass, mesh-comprising glass, wire-comprising glass, colored plate glass, and heat ray-absorbing glass. In particular, the heat ray-absorbing glass is preferable.

The heat ray-absorbing glass is not particularly limited and green glass is particularly preferable. Further, with respect to the heat ray-absorbing glass, if the heat ray-absorbing glass having visible light transmittance of 75% or more and transmittance of 65% or less of the light with wavelength in a range of 900 to 1300 nm is used, since the infrared ray-cutting property of the heat-insulating fine particles is high in a wavelength range longer than 1300 nm and relatively low in a wavelength range of 900 to 1300 nm, the solar radiation transmittance can be lowered to the same visible light ray transmittance and thus the solar radiation cutting ratio can be improved. Such heat ray-absorbing glass may be used in both or one side of a pair of glass plates sandwiching the interlayer film.

The thickness of the glass may be selected properly in accordance with the uses and thus is not particularly limited, however in the case the glass has a property of absorbing high energy ray to be used in the present invention, it should be so thin as to supply energy of the high energy ray to the heat-insulating fine particles.

Since the laminated glass of the present invention comprises the interlayer film for heat-insulating laminated glass of the present invention, the laminated glass is remarkably excellent in heat-insulating property and transparency owing to suppression of the resin deterioration and therefore the laminated glass is preferably useful for a windshield, side glass, rear glass, and roof glass of automobiles; glass parts for vehicles such as aircrafts and electric trains; glass for construction and the like.

Effect of the Invention

The present invention is capable of providing a method of reforming an interlayer film for heat-insulating laminated glass by which an interlayer film for heat-insulating laminated glass capable of exhibiting an excellent optical property may be obtained even if heat-insulating fine particles covered with an inert substance are used, an interlayer film for heat-insulating laminated glass, and laminated glass.

BEST MODE FOR CARRYING OUT THE INVENTION

Hereinafter, the present invention will be described in more detail by way of the following examples, however it is not intended that the present be limited to these examples.

EXPERIMENT EXAMPLE 1

(1) Surface Treatment of Heat-Insulating Fine Particles

Tetraethoxysilane (KBE 04, manufactured by Shin-Etsu Silicone Co., Ltd.) as an inert substance was dissolved in dehydrated ethanol (manufactured by Nakarai Tesque Inc.) to be in a concentration of 2% by weight and an ITO powder (manufactured by Mitsui Kinzoku Co., Ltd.) previously treated at 100° C. for 1 hour was suspended in a concentration of 20% by weight to prepare a solution. The obtained solution was sufficiently stirred by a bead mill to coat the surfaces of the ITO fine particles with silicon oxide and at the same time finely pulverize the particles. Successively, the particles in the resulting dispersion were recovered by a centrifuge. After that, the recovered particles were thermally treated at 150° C. to obtain ITO fine particles surface treated with silicon oxide.

(2) Production of Heat-Insulating Fine Particle-Comprising Plasticizer Solution

The ITO fine particles surface treated with silicon oxide in form of a dispersion of ethanol (manufactured by Nakarai Tesque Inc.) comprising polyoxyalkylene alkylphenyl ether phosphate ester (Plysurf A210G, manufactured by Dai-Ichi Kogyo Seiyaku Co., Ltd.) were added to triethylene glycol bis(2-ethylhexanoate) (3GO, manufactured by Kyowa Hakko Kogyo Co., Ltd.), in which 2-[5-chloro(2H)-benzotriazol-2-yl]-4-methyl-6-(tert-butyl)phenol (TINUVIN 326, manufactured by Ciba Specialty Chemicals), polymer phenolic antioxidant (Irganox 1010, manufactured by Ciba-Geigy), and 2-ethylhexanoic acid (manufactured by Nakarai Tesque Inc.) were dissolved, and dispersed by a paint shaker to obtain an ITO fine particle-comprising plasticizer solution.

(3) Production of Interlayer Film Comprising Heat-Insulating Fine Particles

The obtained ITO fine particle-comprising plasticizer solution was kneaded with polyvinyl butyral resin (S-Lec BH-8, manufactured by Sekisui Chemical Co., Ltd. .) and extruded into a sheet shape out of a mold by an extruder to obtain an interlayer film for heat-insulating laminated glass with a thickness of 760 μm. The composition of the respective components is as shown in Table 1.

(4) Production of Laminated Glass

The obtained interlayer film comprising ITO fine particles was sandwiched by transparent float glass (length 30 cm×width 30 cm×thickness 2.5 mm) and the laminate was put in a rubber bag and degassed at vacuum degree of 20 torr for 20 minutes and then transported to an oven while being kept in degassed state and vacuum-pressed at 90° C. for 30 minutes. The laminated glass preliminarily pressure bonded in such a manner was pressure-bonded at 135° C. and 12 kg/cm² pressure for 20 minutes in an autoclave to obtain laminated glass.

(5) Irradiation of High Energy Ray

The obtained laminated glass was subjected to irradiation of super UV light and super Xe light as a high energy ray under the following conditions and compared with that which was not subjected to irradiation.

(Super UV Light Irradiation Test)

Irradiation samples with a size of 5 cm×10 cm were produced and subjected to the treatment according to the method of the present invention under the following conditions.

Test apparatus: Eye Super UV tester (SUV-F11 model, manufactured by Iwasaki Denki Co., Ltd.)
UV intensity: 100 mW/cm$^2$
Limited wavelength: 295 to 450 nm
Black panel temperature: 63° C.
Relative humidity in the apparatus: 50%
Irradiation distance: 235 mm
Irradiation duration: 300 hours (Super Xe Light Irradiation Test)

Irradiation samples with a size of 5 cm×10 cm were produced and subjected to the treatment according to the method of the present invention under the following conditions.

Test apparatus: Super Xenon Weather Meter S×2-75 (manufactured by Suga Shikenki Co., Ltd.)
UV intensity: 180 W/m$^2$
Black panel temperature: 63° C.
Relative humidity in the apparatus: 50%
Irradiation duration: 300 hours

EXPERIMENT EXAMPLE 2

An interlayer film for heat-insulating laminated glass and laminated glass were produced and high energy ray irradiation was carried out in the same manner as Experiment Example 1, except that tetranormalbutoxyzirconium (Orgatix ZA 60, manufactured by Matsumoto Seiyaku Kogyo K. K.) was used as an inert substance in place of tetraethoxysilane.

EXPERIMENT EXAMPLE 3

An interlayer film for heat-insulating laminated glass and laminated glass were produced and high energy ray irradiation was carried out in the same manner as Experiment Example 1, except that aluminum sec-butyrate (ASBN, manufactured by Kawaken Fine Chemical Co., Ltd.) was used as an inert substance in place of tetraethoxysilane.

EXPERIMENT EXAMPLE 4

ITO fine particles of which the surface is made amorphous were obtained by pulverizing for 2 hours in an agate mortar. Next, an ITO fine particle-comprising plasticizer solution was produced and an interlayer film for heat-insulating laminated glass and laminated glass were produced and high energy ray irradiation was carried out in the same manner as Experiment Example 1.

EXPERIMENT EXAMPLE 5

ITO powder (manufactured by Mitsui Kinzoku Co., Ltd.) was suspended and stirred in an aqueous 5% phosphoric acid solution while ultrasonic wave was applied and successively the recovered powder was dried at 100° C. to obtain an ITO powder in which phosphoric acid was absorbed. The powder was suspended and stirred in an aqueous 5% nitric acid solution comprising ammonium molybdate while ultrasonic wave was applied and the recovered powder was dried at 100° C. to obtain an ITO powder covered with ammonium phosphomolybdate. Next, an ITO fine particle-comprising plasticizer solution was produced and an interlayer film for heat-insulating laminated glass and laminated glass were produced and high energy ray irradiation was carried out in the same manner as Experiment Example 1.

EXPERIMENT EXAMPLE 6

ITO powder was suspended and stirred in an aqueous 5% phosphoric acid solution while ultrasonic wave was applied and successively the recovered powder was dried at 100° C. to obtain an ITO powder in which phosphoric acid was absorbed. The powder was surface-treated and finely pulverized with an aqueous phosphoric acid solution adjusted to have Na$^+$=142 mM, K$^+$=5 mM, Mg$^{2+}$=1.5 mM, Ca$^{2+}$=2.5 mM, Cl$^-$=148.8 mM, HPO$_4^{2-}$=1.0 mM, and SO$_4^{2-}$=0.5 mM by dissolving sodium chloride, sodium hydrogen carbonate, potassium chloride, potassium hydrogen phosphate, magnesium chloride, calcium chloride, sodium sulfate, and trishydroxymethylaminomethane in distilled water. Successively, the recovered powder was dried at 100° C. to obtain an ITO powder of which the surface was covered with hydroxyapatite. Next, an ITO fine particle-comprising plasticizer solution was produced and an interlayer film for heat-insulating laminated glass and laminated glass were produced and high energy ray irradiation was carried out in the same manner as Experiment Example 1.

EXPERIMENT EXAMPLE 7

An interlayer film for heat-insulating laminated glass and laminated glass were produced and high energy ray irradiation was carried out in the same manner as Experiment Example 1, except that 3-methacryloxypropyltrimethoxysilane (KBM 503, manufactured by Shin-Etsu Silicone Co., Ltd.) was used as an inert substance in place of tetraethoxysilane.

EXPERIMENT EXAMPLE 8

An interlayer film for heat-insulating laminated glass and laminated glass were produced and high energy ray irradiation was carried out in the same manner as Experiment Example 1, except that 2-(3,4-epoxycyclohexyl)ethyltrimethoxysilane (KBM 303, manufactured by Shin-Etsu Silicone Co., Ltd.) was used as an inert substance in place of tetraethoxysilane.

EXPERIMENT EXAMPLE 9

An interlayer film for heat-insulating laminated glass and laminated glass were produced and high energy ray irradiation was carried out in the same manner as Experiment Example 1, except that phenylmethoxysilane (KBM 103, manufactured by Shin-Etsu Silicone Co., Ltd.) was used as an inert substance in place of tetraethoxysilane.

REFERENCE EXAMPLE 1

An interlayer film for heat-insulating laminated glass and laminated glass were produced and high energy ray irradiation was carried out in the same manner as Experiment Example 1, except that ITO fine particles whose surfaces were not protected with an inert substance were used.

<Evaluation>

The laminated glass produced in Experiment Examples 1 to 9 and Reference Example 1 was evaluated by the following methods. Results are shown in Tables 1 to 3.

(6) Confirmation of Particle Diameter of Heat-Insulating Fine Particles in Interlayer Film After ultra thin specimen of each interlayer film was produced, the ITO fine particle dispersion state was photographed and observed by the following a transmission electron microscope (TEM) under the following measurement conditions. The photograph of a portion with a size of 3 μm×4 μm was taken at a magnification of ×20000 and expanded as large as three times in printing.

The longest diameter among the fine particles in the photograph taken in the photographing was employed as the particle diameter of the ITO fine particles. Also, the particle diameter of the entire fine particles in the photographed portion with a size of 3 μm×4 μm was measured and the average particle diameter was calculated on the basis of volume conversion average.

Observation apparatus: transmission electron microscope (H-7100 FA type, manufactured by Hitachi Ltd.)
Acceleration voltage: 100 kV
Cut specimen-manufacturing apparatus: ultra microtome (EM-ULTRACUT-S, manufactured by Raika Co., Ltd.), REICHERT-NISSEI-FCS (FC-S type, freezing and cutting system, manufactured by Raika Co., Ltd.)
Knife: DIATOME ULTRA CRYO DRY (manufactured by DIATOME Co., Ltd.)

(7) Measurement of Visible Light Transmittance of Laminated Glass

The visible light transmittance Tv in a wavelength range of 380 to 780 nm, the solar radiation transmittance Ts in a wavelength range of 300 to 2500 nm, the yellow index value, and the b* value in the CIE1976 L*a*b* display system were measured according to JIS Z 8722 and JIS R 3106 using a spectrophotometer (U-4000, manufactured by Shimadzu Corp.).

(8) Measurement of Infrared Ray Transmission and Evaluation of Heat-Insulating Property The infrared ray transmittance Tir in a wavelength region of near infrared rays of 780 to 2100 nm was calculated by standardization using the weight coefficient described in JIS Z 8722 and JIS R 3106. The heat-insulating property of the laminated glass was evaluated based on the value of the measured Tir.

(9) Evaluation of Haze Value of Laminated Glass

The haze value of the laminated glass after high energy ray irradiation was measured according to "Methacrylate sheets for aircrafts" in JIS K 6714 (1995).

(10) Evaluation of Weather Resistance and Light Resistance

The weather resistance and light resistance were evaluated based on the alteration values of the yellow index value, and b* value in the CIE1976 L*a*b* display system, which are determined from the measurement data of visible light transmittance.

The weather resistance and light resistance were evaluated based on the yellow index value alteration, b* value alteration, and visible light transmittance alteration. That is, the weather resistance and light resistance were determined to be good in the case the degree of decrease of the visible light transmittance, of increase of the yellow index value, and of increase of the b* value following the deterioration of the matrix resin, were low.

TABLE 1

|  |  | Experiment Example 1 | Experiment Example 2 | Experiment Example 3 |
|---|---|---|---|---|
| Resin | polyvinyl butyral resin | 100 | 100 | 100 |
| Plasticizer | triethylene glycol bis(2-ethylhexanoate) | 38.0 | 38.0 | 38.0 |
| Heat-insulating particles | indium tin oxide | 0.50 | 0.50 | 0.50 |
| Treatment with inert substance |  | tetraethoxy-silane | tetranormal-butoxyzirconium | aluminum sec-butyrate |
| Other additives | dispersant in plasticizer | 2-ethylhexanoic acid | 0.15 | 0.15 | 0.15 |
|  |  | polyoxyalkylene alkylphenyl ether phosphate ester | 0.10 | 0.10 | 0.10 |
|  |  | ethanol | 0.30 | 0.30 | 0.30 |
|  | weather resisting agent | 2-[5-chloro(2H)-benzotriazol-2-yl]-4-methyl-6-(tert-butyl)phenol | 0.52 | 0.52 | 0.52 |
|  |  | polymer phenolic antioxidant | 0.60 | 0.60 | 0.60 |
| Minimum particle diameter of indium tin oxide in interlayer film (nm) |  | 13 | 15 | 15 |
| Maximum particle diameter of indium tin oxide in interlayer film (nm) |  | 37 | 42 | 37 |
| Average particle diameter of indium tin oxide in interlayer film (nm) |  | 25 | 36 | 27 |

|  |  | before irradiation of high energy ray | after irradiation of super UV light | after irradiation of super Xe light | before irradiation of high energy ray | after irradiation of super UV light | after irradiation of super Xe light | before irradiation of high energy ray | after irradiation of super UV light | after irradiation of super Xe light |
|---|---|---|---|---|---|---|---|---|---|---|
| Property of laminated | visible light transmittance Tv (%) | 81.39 | 84.73 | 83.57 | 81.58 | 83.92 | 84.50 | 80.64 | 83.33 | 84.39 |
|  | solar radiation transmittance Ts (%) | 56.06 | 54.25 | 54.05 | 55.98 | 53.62 | 53.54 | 56.21 | 54.16 | 54.13 |
|  | infrared ray transmittance Tir (%) | 52.34 | 47.81 | 48.29 | 51.22 | 46.74 | 47.28 | 52.15 | 47.28 | 49.15 |

TABLE 1-continued

| glass | haze value (%) | 0.6 | 0.6 | 0.6 | 0.5 | 0.5 | 0.5 | 0.5 | 0.5 | 0.5 |
|---|---|---|---|---|---|---|---|---|---|---|
|  | ΔYI (%) |  | −1.52 | −1.66 |  | −2.15 | −1.87 |  | −1.82 | −1.38 |
|  | Δb* (%) |  | −1.68 | −1.74 |  | −2.35 | −1.75 |  | −1.77 | −1.24 |

TABLE 2

|  |  | Experiment Example 4 | Experiment Example 5 | Experiment Example 6 |
|---|---|---|---|---|
| Resin |  | polyvinyl butyral resin | 100 | 100 | 100 |
| Plasticizer |  | triethylene glycol bis(2-ethylhexanoate) | 38.0 | 38.0 | 38.0 |
| Heat-insulating particles |  | indium tin oxide | 0.50 | 0.50 | 0.50 |
| Treatment with inert substance |  |  | making surface amorphous by agate mortar | ammonium phosphomolybdate | hydroxyapatite |
| Other additives | dispersant in plasticizer | 2-ethylhexanoic acid | 0.15 | 0.15 | 0.15 |
|  |  | polyoxyalkylene alkylphenyl ether phosphate ester | 0.10 | 0.10 | 0.10 |
|  |  | ethanol | 0.30 | 0.30 | 0.30 |
|  | weather resisting agent | 2-[5-chloro(2H)-benzotriazol-2-yl]-4-methyl-6-(tert-butyl)phenol | 0.52 | 0.52 | 0.52 |
|  |  | polymer phenolic antioxidant | 0.60 | 0.60 | 0.60 |
| Minimum particle diameter of indium tin oxide in interlayer film (nm) |  |  | 14 | 13 | 16 |
| Maximum particle diameter of indium tin oxide in interlayer film (nm) |  |  | 45 | 41 | 39 |
| Average particle diameter of indium tin oxide in interlayer film (nm) |  |  | 40 | 38 | 28 |

|  |  | before irradiation of high energy ray | after irradiation of super UV light | after irradiation of super Xe light | before irradiation of high energy ray | after irradiation of super UV light | after irradiation of super Xe light | before irradiation of high energy ray | after irradiation of super UV light | after irradiation of super Xe light |
|---|---|---|---|---|---|---|---|---|---|---|
| Property of laminated glass | visible light transmittance Tv (%) | 80.17 | 84.09 | 83.81 | 80.81 | 84.57 | 83.71 | 81.06 | 83.72 | 84.05 |
|  | solar radiation transmittance Ts (%) | 55.87 | 53.84 | 53.50 | 56.84 | 55.15 | 55.27 | 56.34 | 56.25 | 56.17 |
|  | infrared ray transmittance Tir (%) | 51.47 | 46.71 | 46.92 | 52.68 | 48.35 | 48.91 | 52.05 | 48.96 | 49.96 |
|  | haze value (%) | 0.5 | 0.5 | 0.5 | 0.5 | 0.5 | 0.5 | 0.5 | 0.5 | 0.5 |
|  | ΔYI (%) |  | −1.98 | −2.50 |  | −1.26 | −1.65 |  | −1.78 | −2.84 |
|  | Δb* (%) |  | −2.11 | −2.35 |  | −1.35 | −1.57 |  | −1.82 | −2.81 |

TABLE 3

|  |  | Experiment Example 7 | Experiment Example 8 |
|---|---|---|---|
| Resin |  | polyvinyl butyral resin | 100 | 100 |
| Plasticizer |  | triethylene glycol bis(2-ethylhexanoate) | 38.0 | 38.0 |
| Heat-insulating particles |  | indium tin oxide | 0.50 | 0.50 |
| Treatment with inert substance |  |  | 3-methacryloxypropyltrimethoxy silane | 2-(3,4-epoxycyclohexyl) trimethoxysilane |
| Other additives | dispersant in plasticizer | 2-ethylhexanoic acid | 0.15 | 0.15 |
|  |  | polyoxyalkylene alkylphenyl ether phosphate ester | 0.10 | 0.10 |
|  |  | ethanol | 0.30 | 0.30 |
|  | weather resisting agent | 2-[5-chloro(2H)-benzotriazol-2-yl]-4-methyl-6-(tert-butyl)phenol | 0.52 | 0.52 |
|  |  | polymer phenolic antioxidant | 0.60 | 0.60 |

TABLE 3-continued

| | | | |
|---|---|---|---|
| Minimum particle diameter of indium tin oxide in interlayer film (nm) | | 11 | 15 |
| Maximum particle diameter of indium tin oxide in interlayer film (nm) | | 45 | 47 |
| Average particle diameter of indium tin oxide in interlayer film (nm) | | 33 | 36 |

| | | before irradiation of high energy ray | after irradiation of super UV light | after irradiation of super Xe light | before irradiation of high energy ray | after irradiation of super UV light | after irradiation of super Xe light |
|---|---|---|---|---|---|---|---|
| Property of laminated glass | visible light transmittance Tv (%) | 81.22 | 83.61 | 82.45 | 81.49 | 83.24 | 83.10 |
| | solar radiation transmittance Ts (%) | 55.26 | 54.19 | 54.68 | 56.82 | 54.05 | 54.76 |
| | infrared ray transmittance Tir (%) | 52.67 | 48.63 | 48.19 | 52.28 | 48.59 | 48.55 |
| | haze value (%) | 0.5 | 0.5 | 0.5 | 0.5 | 0.5 | 0.5 |
| | ΔYI (%) | | −1.35 | −1.22 | | −1.29 | −0.85 |
| | Δb* (%) | | −1.28 | −1.27 | | −1.14 | −1.05 |

| | | | Experiment Example 9 | Reference Example 1 |
|---|---|---|---|---|
| Resin | | polyvinyl butyral resin | 100 | 100 |
| Plasticizer | | triethylene glycol bis(2-ethylhexanoate) | 38.0 | 38.0 |
| Heat-insulating particles | | indium tin oxide | 0.50 | 0.50 |
| Treatment with inert substance | | | phenyltrimethoxysilane | none |
| Other additives | dispersant in plasticizer | 2-ethylhexanoic acid | 0.15 | 0.15 |
| | | polyoxyalkylene alkylphenyl ether phosphate ester | 0.10 | 0.10 |
| | | ethanol | 0.30 | 0.30 |
| | weather resisting agent | 2-[5-chloro(2H)-benzotriazol-2-yl]-4-methyl-6-(tert-butyl)phenol | 0.52 | 0.52 |
| | | polymer phenolic antioxidant | 0.60 | 0.60 |
| Minimum particle diameter of indium tin oxide in interlayer film (nm) | | | 18 | 23 |
| Maximum particle diameter of indium tin oxide in interlayer film (nm) | | | 47 | 46 |
| Average particle diameter of indium tin oxide in interlayer film (nm) | | | 29 | 40 |

| | | before irradiation of high energy ray | after irradiation of super UV light | after irradiation of super Xe light | before irradiation of high energy ray | after irradiation of super UV light | after irradiation of super Xe light |
|---|---|---|---|---|---|---|---|
| Property of laminated glass | visible light transmittance Tv (%) | 81.92 | 83.61 | 83.39 | 83.16 | 82.19 | 82.66 |
| | solar radiation transmittance Ts (%) | 57.16 | 54.27 | 54.39 | 57.93 | 57.28 | 57.31 |
| | infrared ray transmittance Tir (%) | 52.30 | 48.89 | 48.27 | 53.62 | 52.19 | 52.83 |
| | haze value (%) | 0.5 | 0.5 | 0.5 | 0.5 | 0.5 | 0.5 |
| | ΔYI (%) | | −1.47 | −1.70 | | 1.23 | 0.77 |
| | Δb* (%) | | −1.53 | −1.89 | | 1.36 | 0.69 |

According to the results of Experiment Examples 1 to 9 in Tables 1 to 3, the ITO fine particles are found finely dispersed in nano-scale. The visible light transmittance is increased and the infrared ray transmittance is lowered by irradiation of super UV light and super Xe light. Further, increase of the yellow index value and b* value is suppressed and it is found that the yellowing of the laminated glass following deterioration of resin is suppressed.

According to Reference Example 1, it is found that since ITO fine particles have surface activity, the matrix resin is deteriorated by high energy ray irradiation and as a result, the visible light transmittance is decreased and the YI value and b* value are increased.

INDUSTRIAL APPLICABILITY OF THE INVENTION

The present invention is capable of providing a method of reforming an interlayer film for heat-insulating laminated glass by which an interlayer film for heat-insulating laminated glass capable of exhibiting an excellent optical property may be obtained even if heat-insulating fine particles covered with an inert substance are used, an interlayer film for heat-insulating laminated glass, and laminated glass.

The invention claimed is:

1. A method of reforming an interlayer film for heat-insulating laminated glass, wherein a high energy ray comprising an electromagnetic wave having energy of 3.0 eV or more is irradiated to an interlayer film for heat-insulating laminated glass comprising a heat-insulating particle covered with an inert substance, a matrix resin, and a liquid plasticizer, to improve transmittance of visible light having a wavelength of 380 to 780 nm, and also to reduce transmittance of a near-infrared radiation having a wavelength of 780 to 2100 nm, and wherein the inert substance is at least one member selected from the group consisting of an insulating metal oxide having band gap energy of 5.0 eV or more, ammonium phosphomolybdate (hydrate), ammonium phosphovanadate (hydrate), ammonium phosphotungstate (hydrate), ammonium phosphate (hydrate), a hydroxy apatite, a carbonate apatite, a fluoride apatite, a tricalcium phosphate, an octacalcium phosphate, organosilane compound, an organotitanium compound, an organoaluminium compound, an organozirconium-aluminium compound, a quaternary-ammonium-salt compound, a $Mo(\eta^3-C_3H_5)_4$ complex, a $Cr(\eta^3-C_3H_5)_3$ complex, a $Co_2(CO)_8$ cluster, and a $Ru_3(CO)_{12}$ cluster, and wherein agglomerates of the heat-insulating particle have an average particle size of 10 to 100 nm.

2. The method of reforming an interlayer film for heat-insulating laminated glass according to claim 1, wherein the high energy ray is at least one kind selected from the group consisting of a super UV light, a UV ray, a visible light, a super Xe light, a Xe light, a laser beam, an electron beam, and a microwave.

3. The method of reforming an interlayer film for heat-insulating laminated glass according to claim 1, wherein the high energy ray comprises light having a wavelength of 300 to 450 nm.

4. The method of reforming an interlayer film for heat-insulating laminated glass according to claim 1, wherein the high energy ray is irradiated so that a yellow index value change ($\Delta YI$) of an interlayer film for heat-insulating laminated glass represented by the following formula (1) is in the range of 0% or less, and a b* value change ($\Delta b^*$) in CIE1976 L*a*b* display system represented by the following formula (2) is in the range of 0% or less, before and after irradiation of the high energy ray:

$$\Delta YI = YI(\text{after irradiation of high energy ray}) - YI(\text{before irradiation of high energy ray}) \quad (1)$$

$$\Delta b^* = b^*(\text{after irradiation of high energy ray}) - b^*(\text{before irradiation of high energy ray}) \quad (2).$$

5. The method of reforming an interlayer film for heat-insulating laminated glass according to claim 1, wherein the inert substance is an insulating metal oxide having band gap energy of 5.0 eV or more.

6. The method of reforming an interlayer film for heat-insulating laminated glass according to claim 1, wherein the inert substance is at least one kind selected from the group consisting of ammonium phosphomolybdate (hydrate), ammonium phosphovanadate (hydrate), ammonium phosphotungstate (hydrate), and ammonium phosphate (hydrate).

7. The method of reforming an interlayer film for heat-insulating laminated glass according to claim 1, wherein the inert substance is at least one kind selected from the group consisting of a hydroxy apatite, a carbonate apatite, a fluoride apatite, a tricalcium phosphate, and an octacalcium phosphate.

8. The method of reforming an interlayer film for heat-insulating laminated glass according to claim 1, wherein the inert substance is at least one kind selected from the group consisting of an organosilane compound, an organotitanium compound, an organoaluminium compound, and an organozirconium-aluminium compound.

9. The method of reforming an interlayer film for heat-insulating laminated glass according to claim 8, wherein the organosilane compound, the organotitanium compound, the organoaluminium compound, and the organozirconium-aluminium compound, are aromatic compounds.

10. The method of reforming an interlayer film for heat-insulating laminated glass according to claim 1, wherein the inert substance is at least one kind selected from the group consisting of, a quaternary-ammonium-salt compound, a $Mo(\eta^3-C_3H_5)_4$ complex, a $Cr(\eta^3-C_3H_5)_3$ complex, a $Co_2(CO)_8$ cluster, and a $Ru_3(CO)_{12}$ cluster.

11. The method of reforming an interlayer film for heat-insulating laminated glass according to claim 1, wherein a surface of the heat-insulating particle is inactivated by protecting the surface of the heat-insulating particle with an amorphous (noncrystalline) metal oxide.

12. The method of reforming an interlayer film for heat-insulating laminated glass according to claim 11, wherein the amorphous metal oxide is at least one kind selected from the group consisting of an amorphous indium oxide, an amorphous tin oxide, an amorphous antimony oxide, an amorphous indium tin oxide, an amorphous antimony oxide-doped tin oxide, an amorphous silicon oxide, an amorphous aluminum oxide, an amorphous zirconium oxide, an amorphous calcium oxide, an amorphous titanium oxide, an amorphous zinc oxide, and an amorphous cerium oxide.

13. The method of reforming an interlayer film for heat-insulating laminated glass according to claim 1, wherein the interlayer film for heat-insulating laminated glass comprises 3.0 parts by weight or less of an indium tin oxide (ITO) particle having an average particle diameter of 100 nm or less, and being protected in the surface, to 100 parts by weight of the matrix resin.

14. The method of reforming an interlayer film for heat-insulating laminated glass according to claim 1, wherein the heat-insulating particle is at least one kind selected from the group consisting of an indium tin oxide (ITO) particle, an antimony-doped tin oxide (ATO) particle, an aluminum-doped zinc oxide particle, an indium-doped zinc oxide particle, a gallium-doped zinc oxide particle, a lanthanum hexaboride particle, and a cerium hexaboride particle.

15. The method of reforming an interlayer film for heat-insulating laminated glass according to claim 1, wherein the matrix resin is a polyvinyl acetal resin.

16. The method of reforming an interlayer film for heat-insulating laminated glass according to claim 1, wherein the liquid plasticizer is at least one kind selected from the group consisting of a dihexyl adipate, a triethylene glycol di-2-ethylhexanoate, a tetraethylene glycol di-2-ethylhexanoate, a tetraethylene glycol di-2-ethylbutyrate, a tetraethylene glycol di-2-heptanoate, and a triethylene glycol di-heptanoate.

17. An interlayer film for heat-insulating laminated glass reformed by the method of reforming an interlayer film for heat-insulating laminated glass according to claim 1, which comprises a heat-insulating particle covered with an inert substance, a matrix resin, and a liquid plasticizer, transmittance of visible light having a wavelength of 380 to 780 nm being 70% or more, transmittance of a solar radiation having the wavelength of 300 to 2100 nm being 85% or less, and a haze value being 1.0% or less.

18. A laminated glass, which is obtained by using the interlayer film for heat-insulating laminated glass according to claim 17.

19. The method of reforming an interlayer film for heat-insulating laminated glass according to claim 1, wherein the heat-insulating particle has an average primary diameter of 5 to 30 nm.

20. A method of reforming an interlayer film for heat-insulating laminated glass, wherein a high energy ray comprising an electromagnetic wave having energy of 3.0 eV or more is irradiated to an interlayer film for heat-insulating laminated glass comprising a heat-insulating particle covered with an inert substance, a matrix resin, and a liquid plasticizer, to improve transmittance of visible light having a wavelength of 380 to 780 nm, and also to reduce transmittance of a near-infrared radiation having a wavelength of 780 to 2100 nm, and wherein a surface of the heat-insulating particle is inactivated by protecting the surface of the heat-insulating particle with an amorphous (noncrystalline) metal oxide, and wherein agglomerates of the heat-insulating particle have an average particle size of 10 to 100 nm.

21. The method of reforming an interlayer film for heat-insulating laminated glass according to claim 20, wherein the amorphous metal oxide is at least one kind selected from the group consisting of an amorphous indium oxide, an amorphous tin oxide, an amorphous antimony oxide, an amorphous indium tin oxide, an amorphous antimony oxide-doped tin oxide, an amorphous silicon oxide, an amorphous aluminum oxide, an amorphous zirconium oxide, an amorphous calcium oxide, an amorphous titanium oxide, an amorphous zinc oxide, and an amorphous cerium oxide.

22. A method of reforming an interlayer film for heat-insulating laminated glass, wherein a high energy ray comprising an electromagnetic wave having energy of 3.0 eV or more is irradiated to an interlayer film for heat-insulating laminated glass comprising a heat-insulating particle covered with an inert substance, a matrix resin, and a liquid plasticizer, to improve transmittance of visible light having a wavelength of 380 to 780 nm, and also to reduce transmittance of a near-infrared radiation having a wavelength of 780 to 2100 nm, and wherein the inert substance is at least one member selected from the group consisting of an insulating metal oxide having band gap energy of 5.0 eV or more, ammonium phosphomolybdate (hydrate), ammonium phosphovanadate (hydrate), ammonium phosphotungstate (hydrate), ammonium phosphate (hydrate), a hydroxy apatite, a carbonate apatite, a fluoride apatite, a tricalcium phosphate, an octacalcium phosphate, organosilane compound, an organotitanium compound, an organoaluminium compound, an organozirconium-aluminium compound, a quaternary-ammonium-salt compound, a $Mo(\eta^3-C_3H_5)_4$ complex, a $Cr(\eta^3-C_3H_5)_3$ complex, a $Co_2(CO)_8$ cluster, and a $Ru_3(CO)_{12}$ cluster, and wherein the heat-insulating particle has an average primary diameter of 5 to 30 nm.

* * * * *